United States Patent
Peled et al.

(10) Patent No.: US 11,599,265 B1
(45) Date of Patent: Mar. 7, 2023

(54) ENHANCEMENT OF NON-TOUCHSCREEN ENABLED MOBILE APPLICATIONS

(71) Applicant: MOTOROLA SOLUTIONS, INC., Chicago, IL (US)

(72) Inventors: Oren Peled, Ramat-Gan (IL); Guy Burko, Holon (IL); Chen Carmiel, Airport City (IL); Svetlana Dimenshtein, Ashdod (IL); Dvir Gozlan, Givat Avni (IL); Konstantin Karasik, Jerusalem (IL); Danny Zadok, Reshon Letzion (IL)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 0 days.

(21) Appl. No.: 17/646,617

(22) Filed: Dec. 30, 2021

(51) Int. Cl.
    *G06F 3/04886* (2022.01)
    *H04M 1/72403* (2021.01)

(52) U.S. Cl.
    CPC .... *G06F 3/04886* (2013.01); *H04M 1/72403* (2021.01)

(58) Field of Classification Search
None
See application file for complete search history.

(56) References Cited

U.S. PATENT DOCUMENTS

| | | | |
|---|---|---|---|
| 5,604,509 A * | 2/1997 | Moore | G09G 5/363 345/2.1 |
| 8,970,551 B2 | 3/2015 | Chang et al. | |
| 9,733,804 B2 | 8/2017 | Huang et al. | |
| 10,979,568 B1 * | 4/2021 | Lu | G06F 3/04817 |
| 10,996,774 B2 | 5/2021 | Bose et al. | |
| 2006/0103623 A1 * | 5/2006 | Davis | H04M 1/56 345/156 |
| 2008/0139195 A1 | 6/2008 | Marsyla et al. | |
| 2011/0242122 A1 * | 10/2011 | Bose | G09G 5/08 345/545 |
| 2012/0256858 A1 * | 10/2012 | Sudo | G06F 3/016 345/173 |
| 2014/0359435 A1 * | 12/2014 | Zheng | G06F 3/016 715/702 |

(Continued)

FOREIGN PATENT DOCUMENTS

JP      6082379 B2     2/2017

OTHER PUBLICATIONS

Levine—The Remote Framebuffer Protocol (Year: 2010).*

*Primary Examiner* — Daniel Rodriguez
*Assistant Examiner* — Gabriel Mercado
(74) *Attorney, Agent, or Firm* — Michael Best & Friedrich LLP

(57) ABSTRACT

Systems and devices for providing a non-touchscreen enabled application through a touchscreen. One embodiment provides a touchscreen and an electronic processor communicably coupled to the touchscreen. The electronic processor configured to generate a touch interface comprising a representation of a non-touch interface provided by a non-touchscreen enabled application, provide the touch interface to the touchscreen, receive a command from the touchscreen corresponding to an interaction with the representation of the non-touch interface, translate the command into at least one event for updating a state of the non-touchscreen enabled application, and provide the at least one event to the non-touchscreen enabled application.

16 Claims, 7 Drawing Sheets

(56) References Cited

U.S. PATENT DOCUMENTS

| | | | |
|---|---|---|---|
| 2015/0026586 A1* | 1/2015 | Nylund | H04L 67/025 |
| | | | 715/740 |
| 2015/0163281 A1* | 6/2015 | Liu | H04L 67/131 |
| | | | 715/740 |
| 2019/0230232 A1* | 7/2019 | Soga | H04N 1/00331 |
| 2019/0278430 A1* | 9/2019 | Zong | G06F 3/0481 |
| 2021/0398085 A1* | 12/2021 | Paul | G06Q 10/1093 |

* cited by examiner

ENHANCEMENT OF NON-TOUCHSCREEN ENABLED MOBILE APPLICATIONS

BACKGROUND OF THE INVENTION

Some legacy software applications are designed for and deployed to portable or mobile wireless communications devices with non-touch enabled displays. These applications receive input via buttons and keypads where, for example, multiple inputs are mapped to each key. For example, the letters a, b, and c are mapped to the button with the number 2.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention and explain various principles and advantages of those embodiments.

Figure 1:
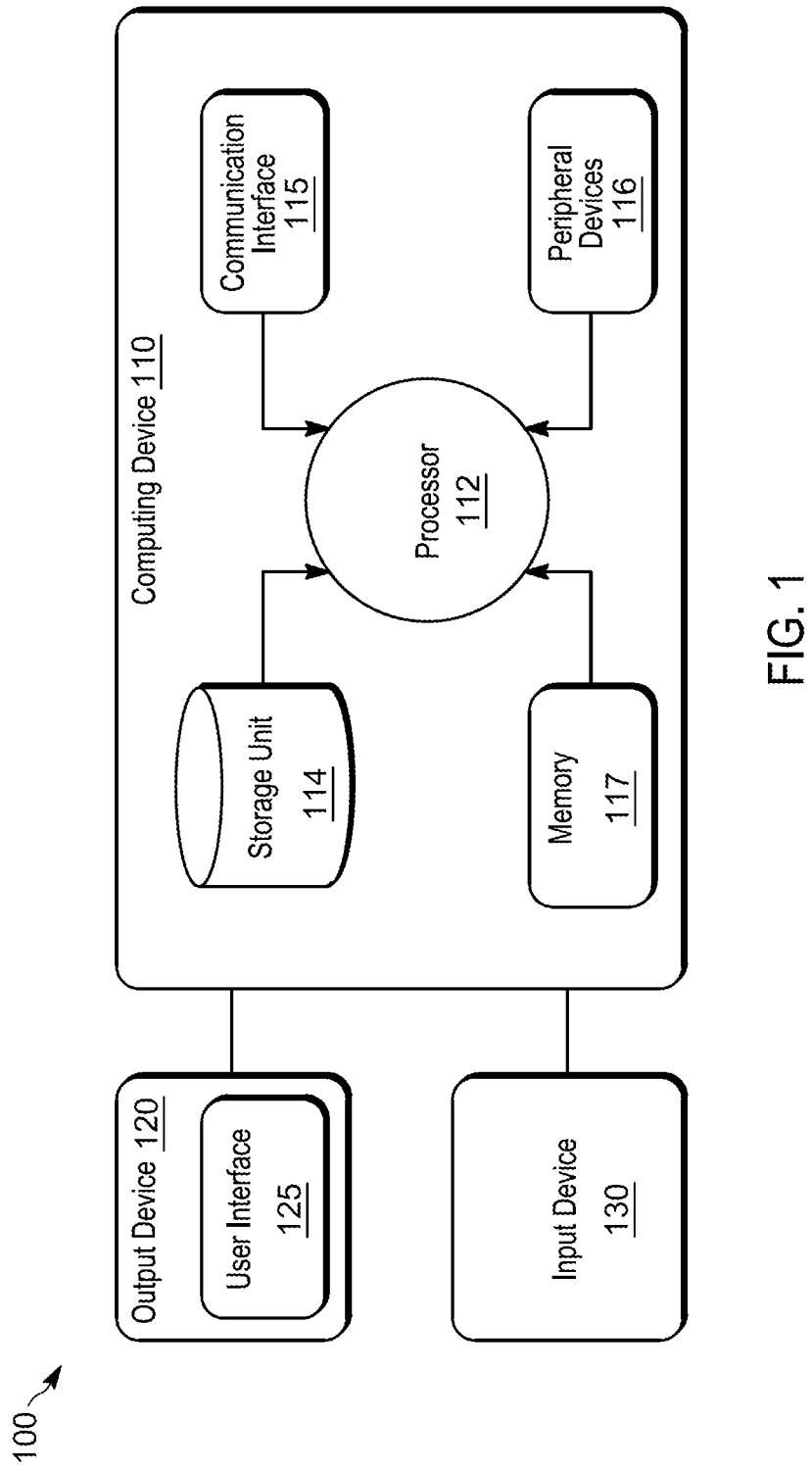
FIG. 1 depicts a block diagram of an example system that includes a computing device that can be programmed or otherwise configured to implement systems or methods of the present disclosure.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments and aspects described and illustrated.

The apparatus and method components have been represented where appropriate by conventional symbols in the drawings, showing only those specific details that are pertinent to understanding the embodiments and aspects disclosed so as not to obscure the disclosure with details that will be readily apparent to those of ordinary skill in the art having the benefit of the description herein.

DETAILED DESCRIPTION OF THE INVENTION

As noted above, mobile communications devices (e.g., two-way radios or smart phones) may be configured with systems configured to receive inputs from a keypad (e.g., telephone-based keypad) and provide a display buffer to a non-touch display. With such systems, users may navigate menus presented on the non-touch display using keypad keys and/or buttons (e.g., up, down, left, right, and the like). These software applications may be very useful. However, most devices today are equipped with touch screens and the user experience of using buttons and keypads is quite different from the user experience with a touch enabled mobile application (e.g., using finger touches and swipes). In addition, in some examples, users must press the numeric keys several times for each symbol when typing a message on a non-touchscreen enabled application. Accordingly, there is a need for porting these non-touchscreen enabled applications to mobile devices with touchscreen enabled displays.

In some examples, the described user interface (UI)/user experience (UX) enhancement system generates a touch interface from a non-touch interface provided by a non-touchscreen enabled application and translates inputs received from interactions with the touch interface (e.g., via a touchscreen) into commands for the non-touchscreen enabled application. For example, the touch interface enables users to select an entry by touching it on the screen. The UI/UX enhancement system receives the entry selection as input from the touchscreen and determines events. These events include, for example, several keystrokes (e.g., up/down) and a selection of a "select" key and are provided to the non-touchscreen enabled application. The UI/UX enhancement system then receives an updated non-touch interface from the non-touchscreen enabled application and updates the touch interface accordingly.

Employment of certain examples enables support of the features of a legacy non-touchscreen enabled application on a mobile device via a touchscreen without the extensive overhead of developing, for example, a new UI or command interface.

One example provides a system for providing a non-touchscreen enabled application through a touchscreen. The system includes a touchscreen and an electronic processor communicably coupled to the touchscreen. The electronic processor is configured generate a touch interface comprising a representation of a non-touch interface provided by a non-touchscreen enabled application, provide the touch interface to the touchscreen, receive a command from the touchscreen corresponding to an interaction with the representation of the non-touch interface, translate the command into at least one event for updating a state of the non-touchscreen enabled application, and provide the at least one event to the non-touchscreen enabled application.

Another example provides a method for providing a non-touchscreen enabled application through a touchscreen. The method includes generating a touch interface comprising a representation of a non-touch interface provided by a non-touchscreen enabled application, providing the touch interface to a touchscreen, receiving a command from the touchscreen corresponding to an interaction with the representation of the non-touch interface, translating the command into at least one event for updating a state of the non-touchscreen enabled application, and providing the at least one event to the non-touchscreen enabled application.

Definitions

As used herein, the term "touchscreen" includes an assembly of both an input (e.g., a touch panel) device and an output (e.g., a display) device.

As used herein, the term "touchable application" includes a software or hardware application designed to receive inputs from a touchscreen.

As used herein, the term "non-touchscreen enabled application" includes a software or hardware application designed to receive inputs from physical keys or a keyboard.

FIG. 1 depicts an example system 100 that includes a computer or computing device 110 that can be programmed or otherwise configured to implement systems or methods of the present disclosure. For example, the computing device 110 can be programmed or otherwise configured to as the mobile devices 210, 260, or 270 described below with reference to FIGS. 2A and 2B.

In the depicted embodiment, the computer or computing device 110 includes an electronic processor (also "processor" and "computer processor" herein) 112, which is optionally a single core, a multi core processor, or a plurality of processors for parallel processing. The depicted embodiment also includes memory 117 (e.g., random-access memory, read-only memory, flash memory), electronic storage unit 114 (e.g., hard disk or flash), communication interface 115 (e.g., a network adapter or modem) for communicating with one or more other systems, and peripheral devices 116, such as cache, other memory, data storage, microphones, speakers, etc. In some embodiments, the memory 117, storage unit 114, communication interface 115 and peripheral devices 116 are in communication with the electronic processor 112 through a communication bus (shown as solid lines), such as a motherboard. In some embodiments, the bus of the computing device 110 includes multiple buses. In some embodiments, the computing device 110 includes more or fewer components than those illustrated in FIG. 1 and performs functions other than those described herein.

In some embodiments, the memory 117 and storage unit114 include one or more physical apparatuses used to store data or programs on a temporary or permanent basis. In some embodiments, the memory 117 is volatile memory and requires power to maintain stored information. In some embodiments, the storage unit 114 is non-volatile memory and retains stored information when the computer is not powered. In further embodiments, memory 117 or storage unit 114 is a combination of devices such as those disclosed herein. In some embodiments, memory 117 or storage unit 114 is distributed across multiple machines such as a network-based memory or memory in multiple machines performing the operations of the computing device 110.

In some cases, the storage unit 114 is a data storage unit or data store for storing data. In some instances, the storage unit 114 store files, such as drivers, libraries, and saved programs. In some embodiments, the storage unit 114 stores user data (e.g., user preferences and user programs). In some embodiments, the computing device 110 includes one or more additional data storage units that are external, such as located on a remote server that is in communication through an intranet or the internet.

In some embodiments, methods as described herein are implemented by way of machine or computer executable code stored on an electronic storage location of the computing device 110, such as, for example, on the memory 117 or the storage unit 114. In some embodiments, the electronic processor 112 is configured to execute the code. In some embodiments, the machine executable or machine-readable code is provided in the form of software. In some examples, during use, the code is executed by the electronic processor 112. In some cases, the code is retrieved from the storage unit 114 and stored on the memory 117 for ready access by the electronic processor 112. In some situations, the storage unit 114 is precluded, and machine-executable instructions are stored on the memory 117.

Examples of operations performed by the electronic processor 112 can include fetch, decode, execute, and write back. In some cases, the electronic processor 112 is a component of a circuit, such as an integrated circuit. One or more other components of the computing device 10 can be optionally included in the circuit. In some cases, the circuit is an application specific integrated circuit (ASIC) or a field programmable gate arrays (FPGAs). In some cases, the operations of the electronic processor 112 can be distributed across multiple machines (where individual machines can have one or more processors) that can be coupled directly or across a network.

In some cases, the computing device 110 is optionally operatively coupled to a communication network via the communication interface 115. The communication network (which may be an example of an "intervening internet protocol (IP) network") may include wireless and wired portions. In some cases, the communication network is implemented using one or more existing networks, for example, a cellular network, the Internet, a land mobile radio (LMR) network, a Bluetooth™ network, a wireless local area network (for example, Wi-Fi), a wireless accessory Personal Area Network (PAN), a Machine-to-machine (M2M) network, and a public switched telephone network. The network may also include future developed networks.

In some cases, all or portions of the communication network operate according to an industry standard land mobile radio (LMR) or cellular protocol, for example, the Project 25 (P25) standard defined by the Association of Public Safety Communications Officials International (APCO), the TETRA standard defined by the European Telecommunication Standards Institute (ETSI), the Digital Private Mobile Radio (dPMR) standard also defined by the ETSI, the Digital Mobile Radio (DMR) standard also defined by the ETSI, the Long Term Evolution (LTE) standard (including LTE-Advanced or LTE-Advanced Pro compliant with, for example, the 3GPP TS 36 specification series), or the 5G standard (including a network architecture compliant with, for example, the 3GPP TS 23 specification series and a new radio (NR) air interface compliant with the 3GPP TS 38 specification series), among other possibilities.

In some cases, the computing device 110 communicates with one or more remote computer systems through the network. For example, the mobile 210 can communicate with a remote computer system via the network. In some cases, a user can access the computing device 110 via the network. In some cases, the computing device 110 is configured as a node within a peer-to-peer network.

In some cases, the computing device 110 includes or is in communication with one or more output devices 120. In some cases, the output device 120 includes a display to send visual information to a user. In some cases, the output device 120 is a liquid crystal display (LCD). In other cases, the output device 120 is a thin film transistor liquid crystal display (TFT-LCD) or an organic light emitting diode (OLED) display. In some cases, the output device 120 is a touch sensitive display that combines a display with a touch sensitive element that is operable to sense touch inputs as and functions as both the output device 120 and the input device 130. In still further cases, the output device 120 is a combination of devices such as those disclosed herein. In some cases, the output device120 displays a user interface (UI) 125 generated by the computing device (for example, software executed by the computing device 110).

In some cases, the computing device 110 includes or is in communication with one or more input devices 130 that are configured to receive information from a user. In some cases, the input device 130 is a keyboard. In some cases, the input device 130 is a keypad (e.g., a telephone-based keypad). In some cases, the input device 130 is a cursor-control device including, by way of non-limiting examples, a mouse, trackball, track pad, joystick, game controller, or stylus. In some cases, as described above, the input device 130 is a touchscreen or a multi-touchscreen. In other cases, the input device 130 is a microphone to capture voice or other sound input. In other cases, the input device 130 is a camera or video camera. In still further cases, the input device is a combination of devices such as those disclosed herein.

In some cases, the computing device 110 includes an operating system configured to perform executable instructions. The operating system is, for example, software, including programs and data that manages the device's hardware and provides services for execution of applications.

It should also be noted that a plurality of hardware and software-based devices, as well as a plurality of different structural components may be used to implement the described examples. In addition, embodiments may include hardware, software, and electronic components or modules that, for purposes of discussion, may be illustrated and described as if most of the components were implemented solely in hardware. In some embodiments, the electronic based aspects of the disclosure may be implemented in software (e.g., stored on non-transitory computer-readable medium) executable by one or more processors, such as electronic processor 112. As such, it should be noted that a plurality of hardware and software-based devices, as well as a plurality of different structural components may be employed to implement various embodiments. It should also be understood that although certain drawings illustrate hardware and software located within particular devices, these depictions are for illustrative purposes only. In some embodiments, the illustrated components may be combined or divided into separate software, firmware, or hardware. For example, instead of being located within and performed by a single electronic processor, logic and processing may be distributed among multiple electronic processors. Regardless of how they are combined or divided, hardware and software components may be located on the same computing device or may be distributed among different computing devices connected by one or more networks or other suitable communication links.

Example Systems

Figure 2A:
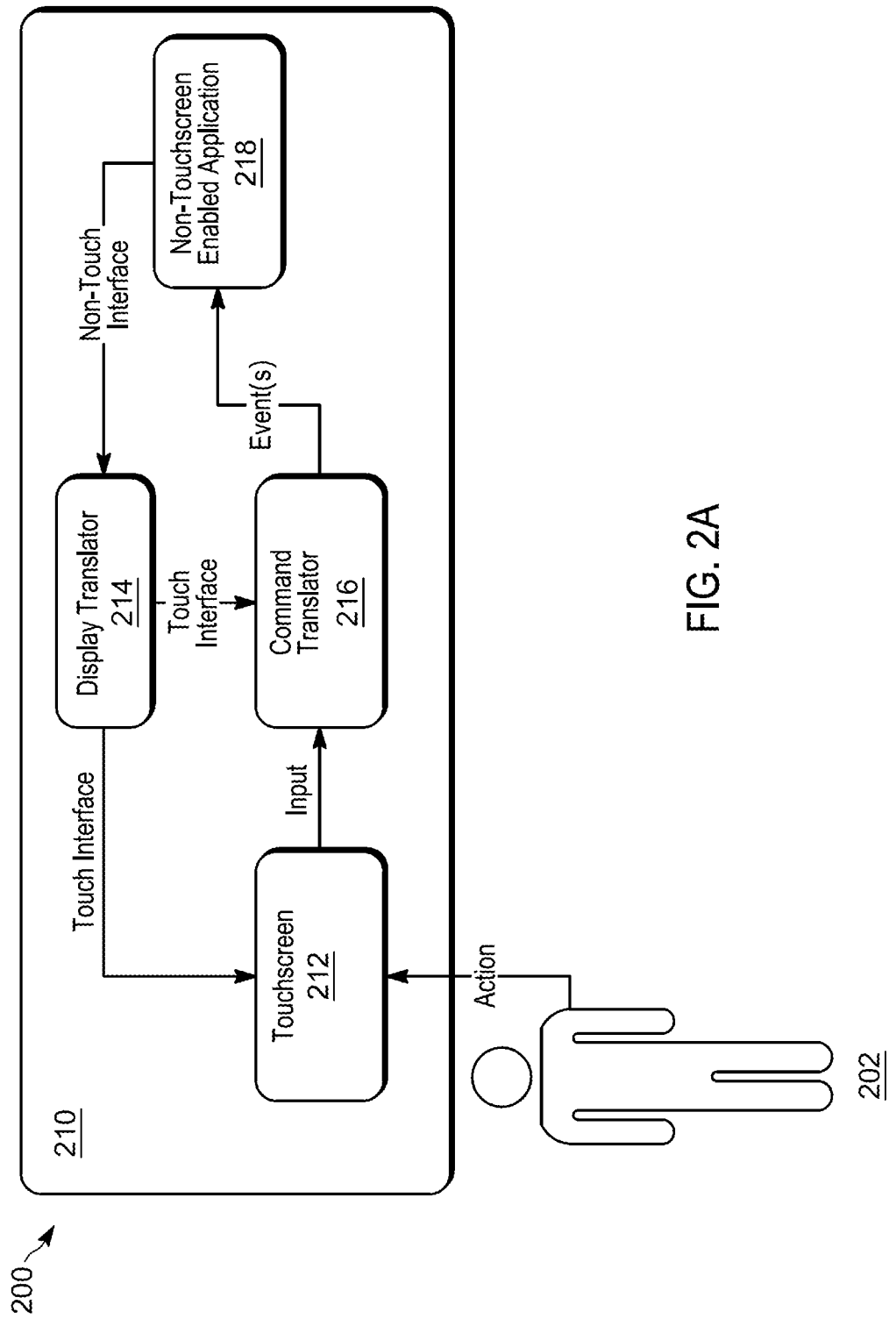
FIGS. 2A and 2B each depict an example UI/UX enhancement system deployed to a mobile device that includes a touchscreen, according to some aspects.

FIG. 2A depicts an example UI/UX enhancement system 200 deployed to a mobile device 210 that includes a touchscreen 212. In the example shown, the system includes a display translator module 214, a command translator module 216, and a non-touchscreen enabled application 218. As described above, in some embodiments, the non-touchscreen enabled application 218 is configured to receive input from a keypad and provide output via a non-touch interface (e.g., via a display buffer, such as a framebuffer). In some embodiments, the non-touchscreen enabled application 218 is executed in a separate processing core or processor than the display translator module 214 and a command translator module 216. In some embodiments, the non-touchscreen enabled application 218, the display translator module 214, and a command translator module 216 are executed by the same processing core or processor. In some embodiments, the non-touchscreen enabled application 218 is a man machine interface (MMI) framework, which is embedded in an operating system (OS) of the mobile device 210.

Figure 2B:
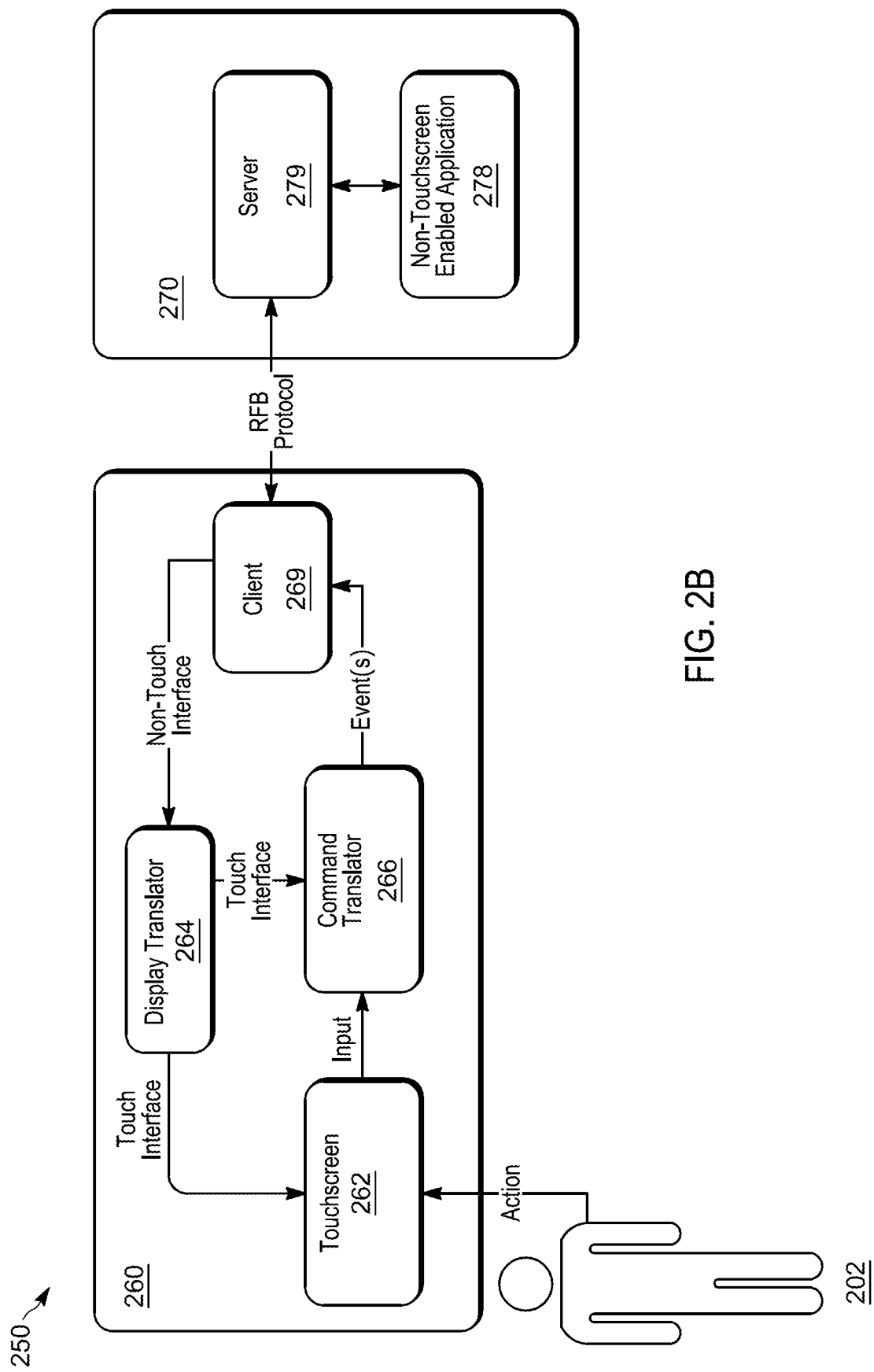
Figure 3A:
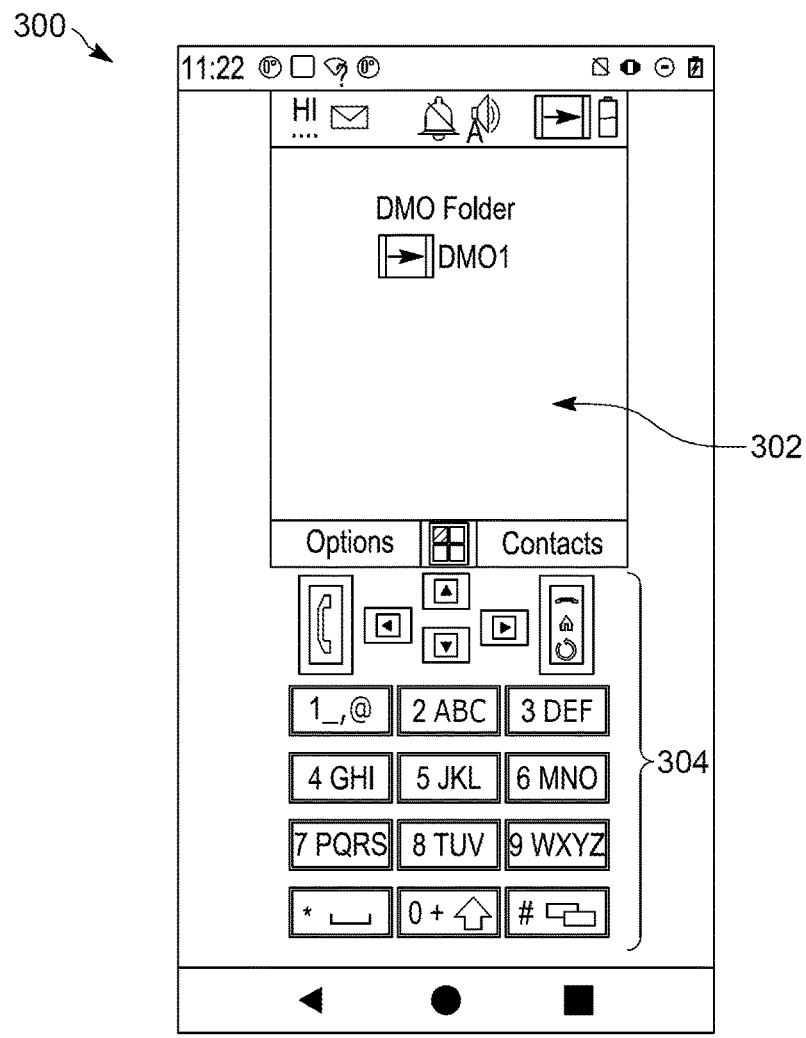
FIG. 3A depicts an example display screen that includes a non-touch interface and a keypad representation.

FIG. 3A depicts an example display screen 300 that includes a non-touch interface 302 and a keypad representation 304. As depicted in FIG. 3A, the keypad representation 304 includes arrows buttons (e.g., up, down, left, right), a menu button, a select button, a back button, a send/end button, and button for each digit 0-9 that are also mapped to various characters and symbols (e.g., the button with the number 2 may also be mapped to the letters a, b, and c). In some embodiments, the non-touchscreen enabled application 218 is configured to provide the non-touch interface 302 and receive input from the keypad representation 304 (or a physical keypad, see FIGS. 2B and 4).

Figure 3B:
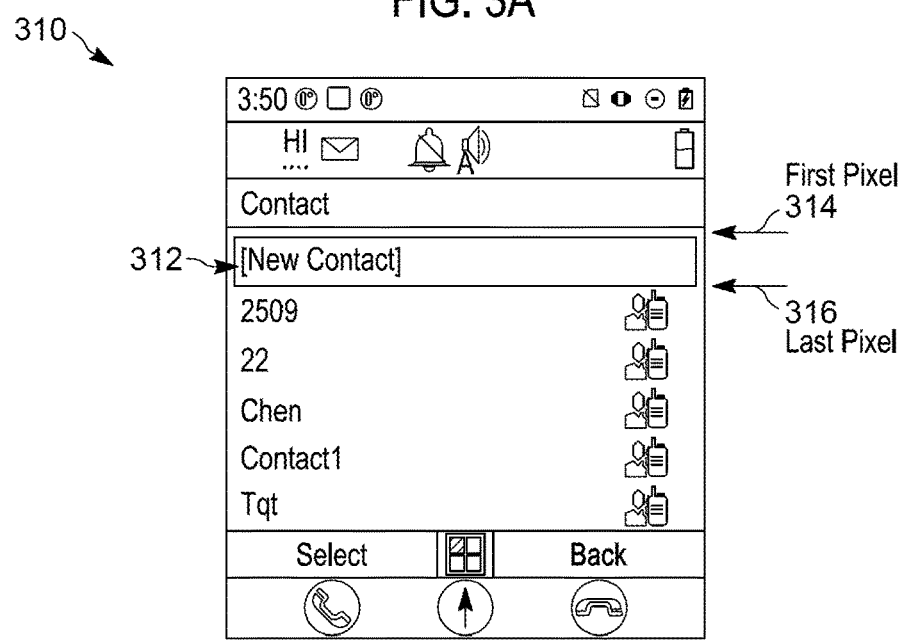
FIG. 3B depicts an example non-touch interface that includes a selected segment.

In some embodiments, the display translator module 214 is configured to receive the non-touch interface from the non-touchscreen enabled application 218, generate a touch interface based on the received data, and provide the touch interface to the touchscreen 212. In some embodiments, the display translator module 214 is configured to generate the touch interface by determining the relative coordinates on the received non-touch interface and identify start and end points through image processing and color recognition. For example, in some cases, the display translator module 214 identifies the beginning and end of a selected segment by determining the first pixel and the last pixel in a highlight color on the received non-touch interface. As another example, in some cases, the display translator module 214 identifies fonts from the touch interface by calculating distances between pixels in the received non-touch interface. For example, distances of 80, 100, and 120 pixels relate to font sizes number 1, 2, 3 respectively. FIG. 3B depicts an example non-touch interface 310, that includes a selected segment 312 and the identified first pixel 314 and last pixel 316 of the selected segment 312.

The following is an example pseudo code for an implementation calculating font size based on a non-touch interface:

```
if (fontSize=1) {
    when {
        yPressCord in 210 ... 309→return (210—yBlueStart)/100
        yPressCord in 310 ... 419→return (310—yBlueStart)/100
        yPressCord in 420 ... 519→return (420—yBlueStart)/100
        yPressCord in 520 ... 619→return (520—yBlueStart)/100
        yPressCord in 620 ... 719→return (620—yBlueStart)/100
        yPressCord in 720 ... 829→return (720—yBlueStart)/100
        yPressCord>=830→return (830—yBlueStart)/100
    }
}
```

In some instances, the command translator module 216 is configured to receive input from the touchscreen 212 (e.g., actions performed by the user 202 to the touchscreen 212) and translate the receive input into a least one event that is provided to the non-touchscreen enabled application 218. As an example, in some embodiments, the command translator module 216, based on the input received by from the touchscreen 212 and the touch interface determined by the display translator module 214, identifies a first selection position (e.g., pixel coordinates) and a click position, and determines a delta between the first selection position and the click position. In some cases, the command translator module 216 determines a number of lines (e.g., up or down) based on the delta, which are translated into events corresponding to arrow key events (e.g., a positive delta covering a certain distance may be translated into 3 up arrow events) and a selection key event.

In some cases, the touch interface generated by the display translator module 214 includes a virtual keyboard (e.g., a qwerty, azerty, or alphabetical keyboard). When, for example, the user 202 selects a key (mapped to a symbol) from the virtual keyboard via the touchscreen 212, the command translator module 216, in some cases, receives the selection from the touchscreen 212 and determines a number of events for selecting the symbol from a keypad from which the non-touchscreen enabled application 218 is configured to receive input (e.g., one event for the number 2 key when a "2" is received, two events for the number 2 key when an "a" is received, three events for the number 2 key when a "b" is received, four events for the number 2 key when a "c" is received, a number of arrow key events determined based on a direction and gesture distance of a swipe command when a swipe command is received, and the like).

Figure 3C:
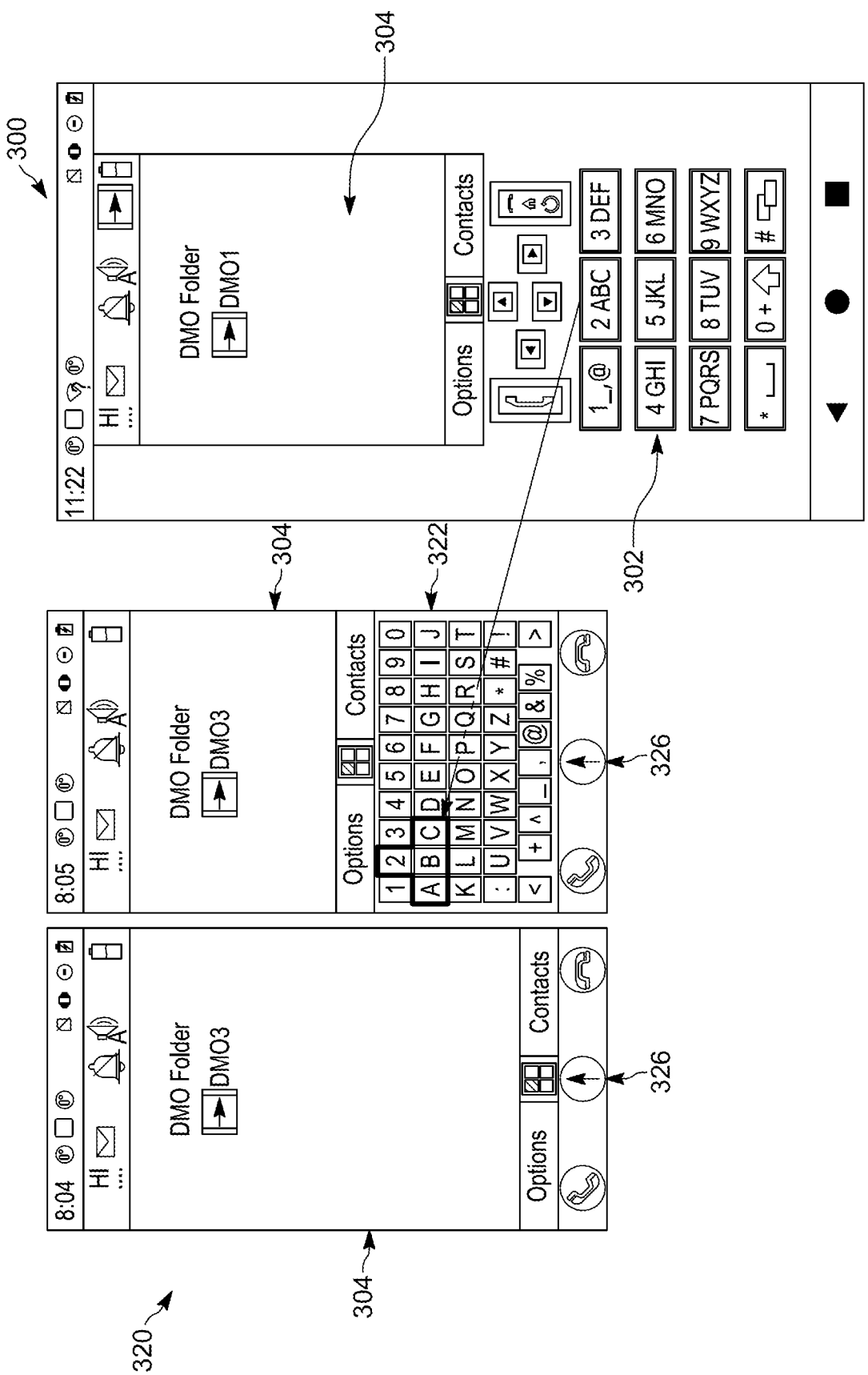
FIG. 3C depicts an example mapping between an example display screen and a touch interface that includes a non-touch interface and a representation alphabetical keyboard.

FIG. 3C depicts an example mapping between the example display screen 300 and a touch interface 320 that includes the non-touch interface 302 and an alphabetical keyboard representation 322. As depicted, keys from the alphabetical keyboard representation 322 are each mapped to the keypad representation 304 such that events can be provided to the-touchscreen enabled application 218 based on this mapping as the user 202 interacts with (e.g., selects various keys) the keypad representation 304. The touch interface 320 includes a toggle key 326 that displays and hides the alphabetical keyboard representation 322.

Figure 4:
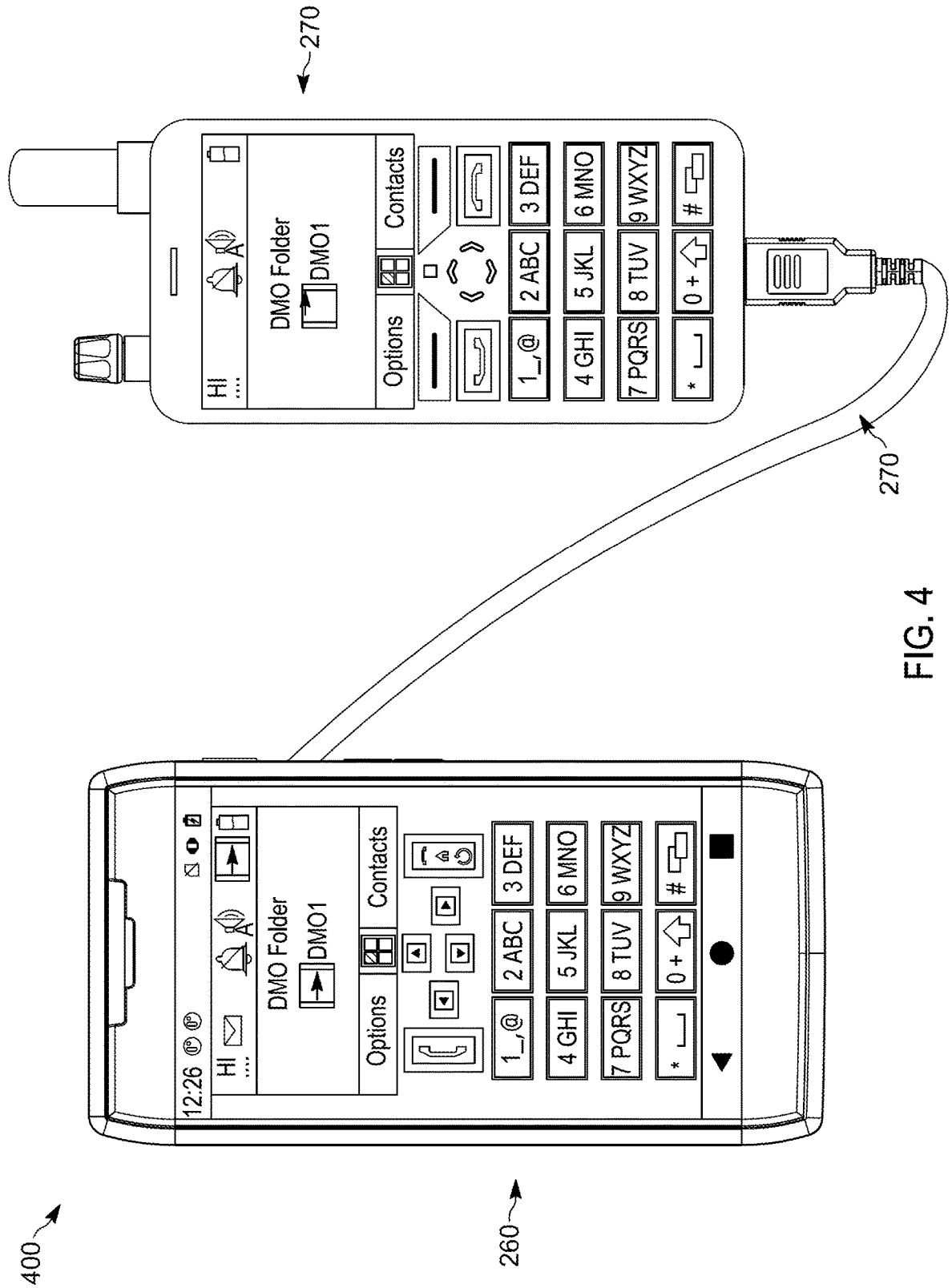
FIG. 4 depicts an example UI/UX enhancement system where the mobile devices are connected to each other via a cable.

FIG. 2B depicts an example UI/UX enhancement system 250 deployed to a mobile device 260 that includes a touchscreen 262 (and also referred to as touch enabled device 260). As depicted, the touch enabled device 260 is connected (e.g., via a wire connection or wireless communication) to a mobile device 270 that includes a non-touch enabled display (non-touch enabled device 270). FIG. 4 depicts an example UI/UX enhancement system 400 where the mobile device 260 is connected to the mobile device 270 via a cable 402.

Like in the example system 200 depicted in FIG. 2A, the touch enabled device 260 depicted in FIG. 2B includes a display translator module 264 and a command translator module 266, which are substantially similar to their respective modules depicted in FIG. 2A. However, as depicted, these modules are configured to communicate with a non-touchscreen enabled application 278 deployed to the non-touch enabled device 270 (a separate device). In the depicted example 250, the display translator module 264 and the command translator module 266 send and receive communications with the touchable application 278 via a client module 269. In some instances, the client module 269 is deployed to the touch enabled device 260 and communicates with a server module 279 that is deployed to the non-touch enabled device 270.

In some cases, the client module 269 and the server module 279 communicate via a remote framebuffer (RFB) protocol, such as remote desktop protocol (RDP). In some cases, the server module 279 maintains a local copy of a non-touch interface received from the non-touchscreen enabled application 278 and sends updates for the non-touch interface, received from the non-touchscreen enabled application 278, to the client module 269. In some cases, the client module 269 provides the events determined by the command translator module 266 to the non-touchscreen enabled application 278 via the server module 279. For example, the client module 269 sends a request for a framebuffer update to the server module 279, for example, after providing the events determined by the command translator module 266.

Example Process

Figure 5:
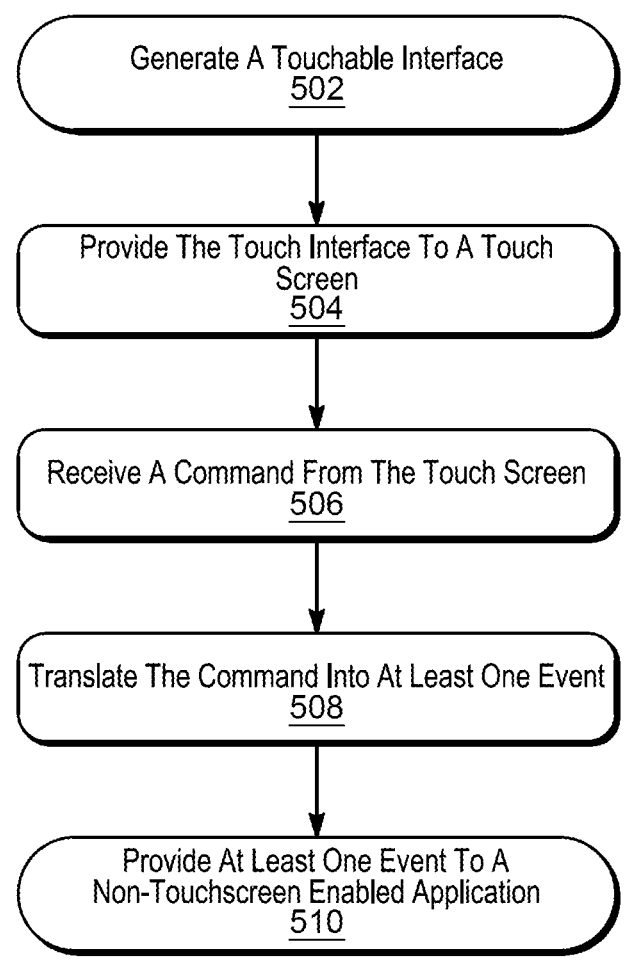
FIG. 5 depicts a flowchart of an example process for providing a non-touchscreen enabled application through a touchscreen using an example UI/UX enhancement system.

FIG. 5 depicts a flowchart of an example process 500 that can be implemented by embodiments of the present disclosure, for example, the systems and devices depicted in FIGS. 2A and 2B. The process 500 generally shows in more detail how a non-touchscreen enabled application is provided through a touchscreen using the described UI/UX enhancement system.

For clarity of presentation, the description that follows generally describes the process 500 in the context of FIGS. 1-4. However, it will be understood that the process 500 may be performed, for example, by any other suitable system, environment, software, and hardware, or a combination of systems, environments, software, and hardware as appropriate. In some embodiments, various operations of the process 500 can be run in parallel, in combination, in loops, or in any order.

At block 502, a touch interface is generated. In some cases, the touch interface includes a representation of a non-touch interface. In some cases, the non-touch interface is provided by a non-touchscreen enabled application. In one example, generating the touch interface includes identifying a selected segment in the non-touch interface based on a highlighted color, and identifying a font based on a calculated distance between a first pixel and a last pixel in the highlighted color. From block 502, the process 500 proceeds to block 504.

At 504, the touch interface is provided to a touchscreen. In some cases, the touch interface includes a virtual keyboard. In some instances, the command includes a selection of a virtual key from the virtual keyboard. In one example, at least one event includes at least one keystroke mapping the selected virtual key to a virtual telephone-based keypad or a virtual numeric keypad. In some cases, the touch interface is provided to the touchscreen via a framebuffer. From block 504, the process 500 proceeds to block 506.

At block 506, a command corresponding to an interaction with the representation of the non-touch interface is received from the touchscreen. In some cases, the command is determined by identifying a beginning selection pixel of a touchscreen input, identifying an ending selection pixel of the touchscreen input, and determining a delta between a beginning selection pixel and ending selection pixel. In some instances, the command includes a swipe command. In one example, translating the command into the at least one event includes: determining a direction and a distance of the swipe command, determining a number of steps within the non-touch interface based on the distance, and determining the at least one event based on the number of steps. From block 506, the process 500 proceeds to block 508.

At block 508, the command is translated into at least one event for updating a state of the non-touchscreen enabled application. In one example, the non-touchscreen enabled application is a radio screen module. From block 508, the process 500 proceeds to block 510.

At block 510, the at least one event is provided to the non-touchscreen enabled application. In some cases, an update to the non-touch interface determined according to the at least one event is received from the non-touchscreen enabled application. An updated touch interface based on the received update to the non-touch interface is generated and the updated touch interface is provided to the touchscreen. In some cases, the non-touchscreen enabled application is executed by the electronic processor that is executing the process 500. In other instances, the non-touchscreen enabled application is executed by a second electronic processor coupled to a first electronic processor that is executing the process 500. In some cases, the first electronic processor and the touchscreen are housed on a first device. In other cases, the second electronic processor is housed on a second device. In some cases, the non-touch interface is received from the non-touchscreen enabled application via a client module executed on the first device and a server module executed on the second device. In one example, the client module and server module communicate via RFB protocol, for example, RDP. In some examples, the at least one event is provided to the non-touchscreen enabled application via the client module and the server module. After block 510, the process 500 ends.

In the foregoing specification, specific embodiments have been described. However, various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover, in this document, relational terms such as first and second, top and bottom, and the like may be used solely to distinguish one entity or action from another entity or action without necessarily requiring or implying any actual such relationship or order between such entities or actions. The terms "comprises," "comprising," "has," "having," "includes," "including," "contains," "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a," "has . . . a," "includes . . . a," or "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially," "essentially," "approximately," "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way but may also be configured in ways that are not listed. The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

What is claimed is:

1. A system for providing a non-touchscreen enabled application through a touchscreen, comprising:
   a touchscreen; and
   a first electronic processor communicably coupled to the touchscreen and configured to:
      generate a touch interface comprising a virtual keyboard and a representation of a non-touch interface provided by a non-touchscreen enabled application by:
         determining, through image processing and color recognition of the non-touch interface, relative coordinates on the non-touch interface,
         identifying, through image processing and color recognition of the non-touch interface, starting points and ending points of graphical elements within the non-touch interface, wherein the graphical elements include a highlighted color,
         identifying a selected segment in the non-touch interface based on the highlighted color, and
         identifying a font based on a calculated distance between a first pixel and a last pixel in the highlighted color;
      provide the touch interface to the touchscreen;
      receive a touch screen input from the touchscreen corresponding to an interaction with the touch interface;
      identify a beginning selection pixel and an ending selection pixel of the touchscreen input;
      determine a command based on a delta between the beginning selection pixel and the ending selection pixel;
      translate the command into an event for updating a state of the non-touchscreen enabled application; and
      provide the event to the non-touchscreen enabled application.

2. The system of claim 1, wherein the non-touchscreen enabled application is configured to receive input from a telephone-based keypad or a numeric keypad, wherein the command comprises a selection of a virtual key from the virtual keyboard, and wherein the event comprises a keystroke mapping the selected virtual key to a virtual telephone-based keypad or a virtual numeric keypad.

3. The system of claim 1, wherein the command comprises a swipe command, and wherein, to translate the command into the event, the first electronic processor is further configured to:
   determine a direction and a distance of the swipe command;
   determine a number of steps within the non-touch interface based on the distance;
   and determine the event based on the number of steps.

4. The system of claim 1, wherein the first electronic processor is configured to:

receive, from the non-touchscreen enabled application, an update to the non-touch interface determined according to the vent;

generate an updated touch interface based on the received update to the non-touch interface;

and provide the updated touch interface to the touchscreen.

5. The system of claim 1, wherein the non-touchscreen enabled application is executed by the first electronic processor.

6. The system of claim 1, wherein the non-touchscreen enabled application is executed by a second electronic processor coupled to the first electronic processor.

7. The system of claim 6, wherein the first electronic processor and the touchscreen are housed on a first device, wherein the second electronic processor is housed on a second device, wherein the first device and second device are communicably coupled via a wire or wireless communication.

8. The system of claim 7, wherein the non-touch interface is received from the non-touchscreen enabled application via a client module executed by the first electronic processor and a server module executed by the second electronic processor, wherein the client module and server module communicate via remote framebuffer (RFB) protocol, and wherein the first electronic processor is further configured to:

provide the event to the non-touchscreen enabled application via the client module and the server module.

9. The system of claim 8, wherein the RFB protocol is a remote desktop protocol (RDP).

10. The system of claim 1, wherein the touch interface is provided to the touchscreen via a framebuffer.

11. The system of claim 1, wherein the non-touchscreen enabled application is an embedded man machine interface (MMI) framework.

12. A method for providing a non-touchscreen enabled application through a touchscreen, the method comprising:

generating a touch interface comprising a virtual keyboard and a representation of a non-touch interface provided by a non-touchscreen enabled application by:

determining, through image processing and color recognition of the non-touch interface, relative coordinates on the non-touch interface, identifying, through image processing and color recognition of the non-touch interface, starting points and ending points of graphical elements within the non-touch interface, wherein the graphical elements include a highlighted color, identifying a selected segment in the non-touch interface based on the highlighted color, and identifying a font based on a calculated distance between a first pixel and a last pixel in the highlighted color;

determining relative coordinates on the non-touch interface and identifying starting points and ending points of graphical elements within the non-touch interface;

providing the touch interface to the touchscreen;

receiving a touch screen input from the touchscreen corresponding to an interaction with the touch interface;

identifying a beginning selection pixel and an ending selection pixel of the touchscreen input;

determining a command based on a delta between the beginning selection pixel and the ending selection pixel;

translating the command into an event for updating a state of the non-touchscreen enabled application; and providing the event to the non-touchscreen enabled application.

13. The method of claim 12, wherein the touch interface comprises a virtual keyboard, wherein the command comprises a selection of a virtual key from the virtual keyboard, and wherein the event comprises a keystroke mapping the selected virtual key to a virtual telephone-based or numeric keypad.

14. The method of claim 12, wherein the command comprises a swipe command, and wherein translating the command into the vent, comprises:

determining a direction and a distance of the swipe command;

determining a number of steps within the non-touch interface based on the distance;

and determining the event based on the number of steps.

15. The method of claim 12, further comprising:

receiving, from the non-touchscreen enabled application, an update to the non-touch interface determined according to the event;

generating an updated touch interface based on the received update to the non-touch interface;

and providing the updated touch interface to the touchscreen.

16. The method of claim 12, wherein the non-touch interface is received from the non-touchscreen enabled application via a client module and a server module, wherein the client module and server module communicate via remote framebuffer (RFB) protocol, wherein the server module and the non-touchscreen enabled application are deployed to a separate device, and wherein the method further comprises:

providing the event to the non-touchscreen enabled application via the client module and the server module.

\* \* \* \* \*